June 13, 1939.  D. W. MAIN  2,162,351
COMBINED ROAD AND RAIL VEHICLE AND TRACK SYSTEM THEREFOR
Filed May 18, 1936  2 Sheets-Sheet 2
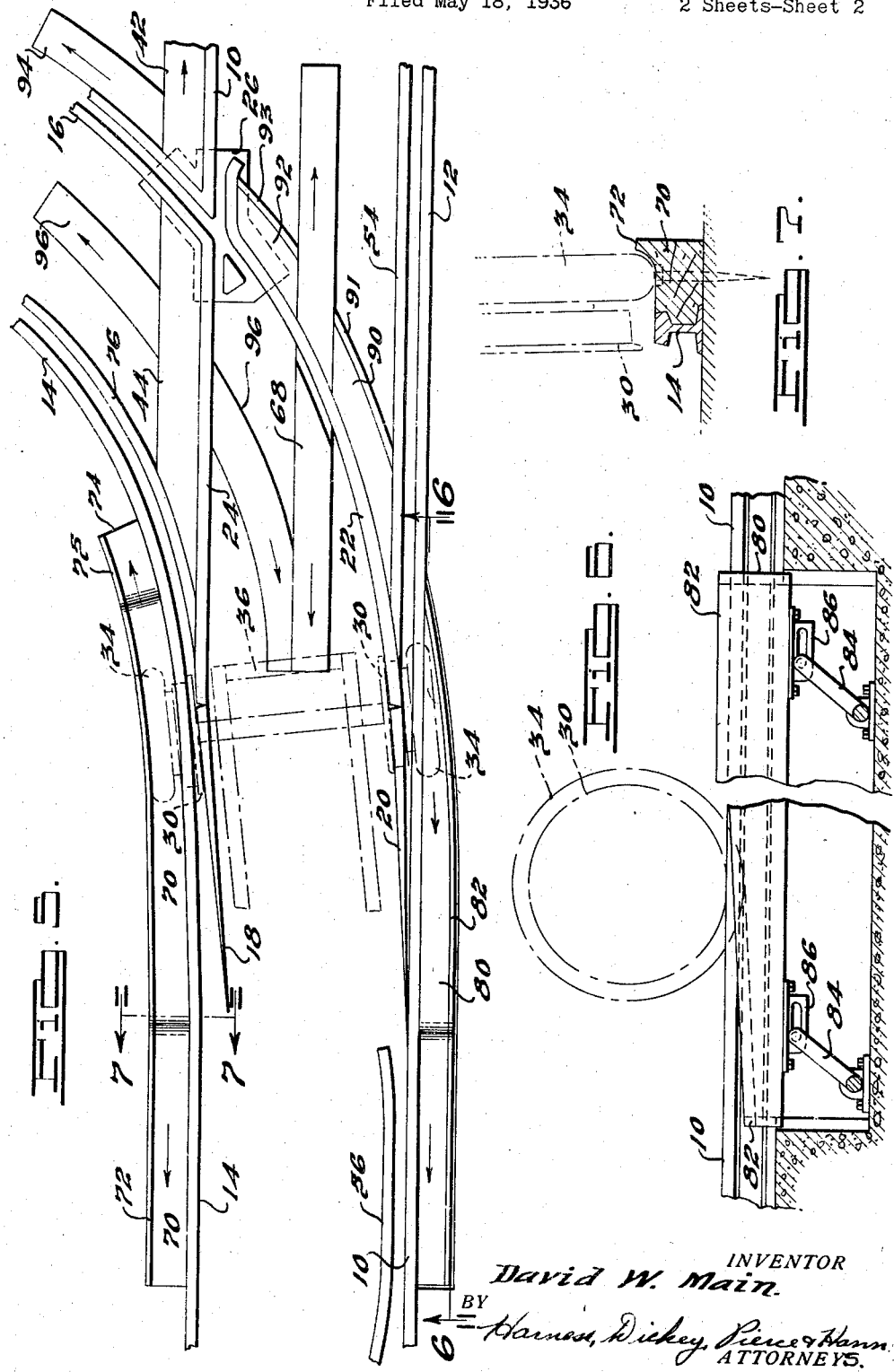
INVENTOR
David W. Main.
BY
Harness, Dickey, Pierce & Hann
ATTORNEYS.

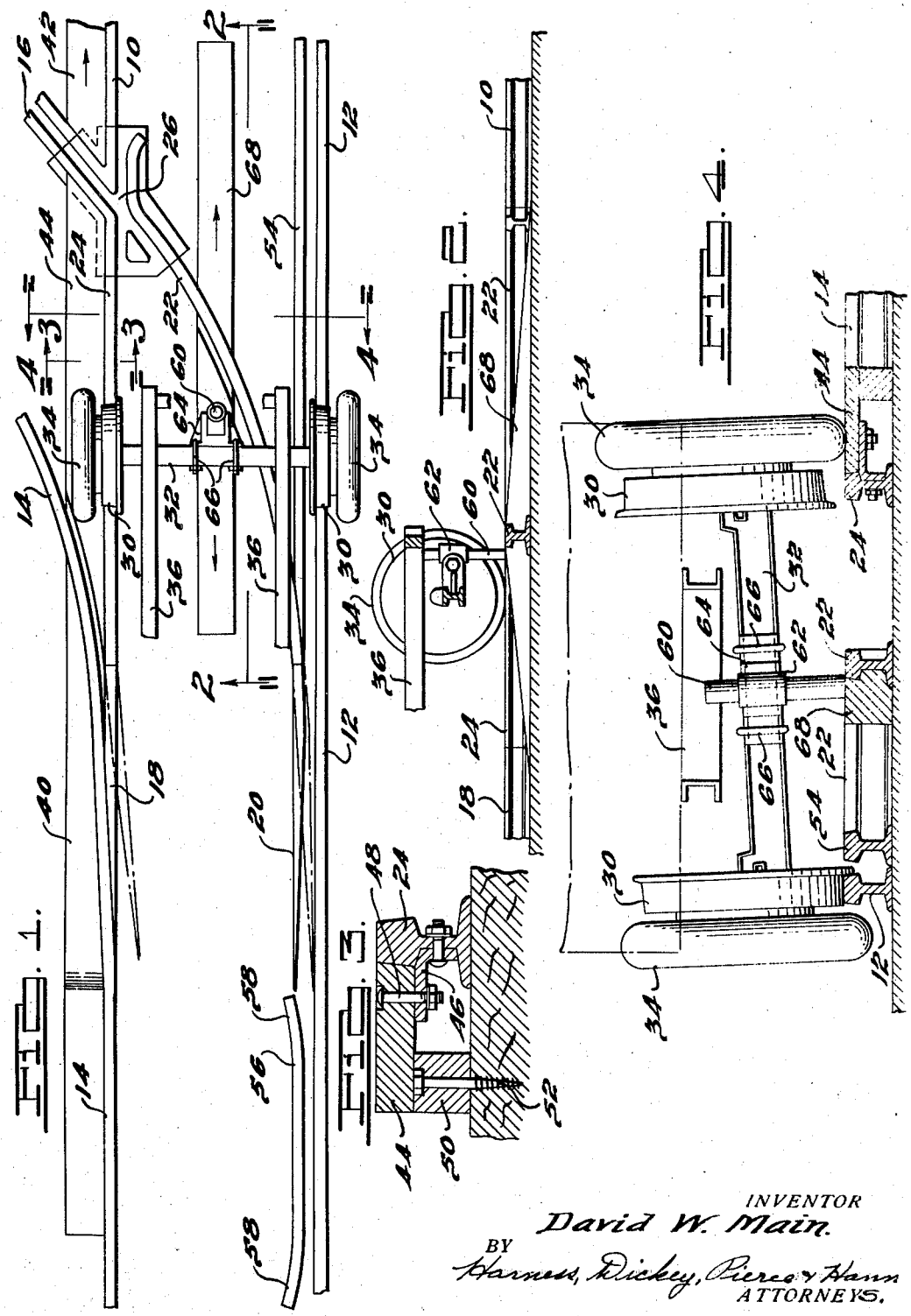

Patented June 13, 1939

2,162,351

UNITED STATES PATENT OFFICE 2,162,351

COMBINED ROAD AND RAIL VEHICLE AND TRACK SYSTEM THEREFOR

David W. Main, Detroit, Mich., assignor to Transportation Systems, Inc., a corporation of Oklahoma Application May 18, 1936, Serial No. 80,383

8 Claims. (Cl. 105—215)

The present application relates to combined road and rail vehicles, and in particular provides an improved method of and means for selectively guiding such vehicles past or into rail turn-outs. The present application is a continuation in part of applicant's co-pending application, Serial No. 630,887, filed August 29, 1932, now Patent No. 2,043,703, granted June 9, 1936, and assigned to the same assignee as the present application.

The above identified parent application discloses a combined road and rail vehicle comprising front and rear sets of dirigible and driving wheels, respectively. Each wheel is of a dual construction, embodying a pneumatic highway portion and a flanged rail engaging portion slightly axially spaced therefrom. The pneumatic portions of the wheels are of slightly greater diameter than the flanged portions, so that, during travel upon a highway, the pneumatic portions engage the highway, and the flange portions are maintained in spaced relation therefrom. During rail travel, the flanged rail portions of each wheel engage a corresponding rail and take all of the vehicle load. The difference in diameter between the flange portions and the pneumatic portions is less than the height of each rail, so that, during rail travel, the pneumatic portions are maintained above and free of the track structure.

In the embodiment to which the claims of the co-pending application are in part directed, the vehicle is guided during track travel by a pair of pony wheels or pilot wheels, associated with each pair of main wheels, which are selectively raisable and lowerable from and to track-engaging position, and act to guide the flanged portions of the main wheels during rail travel. During highway travel, the pony wheels are retracted out of engagement with the roadway and so do not interfere with the usual steering or other operation of the vehicle.

As stated generally above, the present invention is directed principally to features of trackway constructions to facilitate the guiding of combined road and rail vehicles past or into rail turnouts or switches. In the practice of the present invention, the above identified pilot wheels of the co-pending construction may be utilized but, preferably, such pilot wheels are eliminated, since the flanged wheel portions guide the vehicle during normal travel, and the improved trackway system of the present invention provides all the guiding action that is required for rail turnouts or switches. To accommodate the vehicle of the present invention to safe traversal of rail intersections and highway intersections, it is preferred to equip the vehicle with a guide pin arrangement of the construction disclosed and claimed in Patent No. 2,042,265 granted May 26, 1936, on co-pending application of the present applicant, Serial No. 536,207, filed May 9, 1931, and assinged to the same assignee as the present application.

Objects of the present invention are, accordingly, to provide, for use in the operation of combined road and rail vehicles, an improved trackway system adapted to safely guide such a vehicle past or into a rail turnout or switch; to provide such a system embodying one or more ramps adjacent one rail of a track effective to raise the associated pneumatic element of a dual wheel to the level of the turnout rails, and further embodying one or more guard rail elements adjacent the other rail of the track to guide the associated flanged element of an opposite dual wheel during the time that the just mentioned pneumatic element is raised by the ramp; to provide such a system in which a usual switch point may be utilized to form a part of the just mentioned guard rail; to provide such a system utilizing one or more guard rail elements which, with an adjacent rail, form a groove to receive the flange and an associated flanged part of a dual wheel, to positively guide such flanged element; and to provide such a system providing one or more ramps to cooperate with a vehicle guide pin to carry such guide pin over the turnout rail or rails.

Further objects of the present invention are to provide, for use in connection with a combined road and rail vehicle, a trackway guiding system for effectively guiding such a vehicle into a rail turnout; to provide such a system embodying one or more ramp elements positioned along the track, certain of which are selectively projectable and retractible, depending upon whether the vehicle is guided into the rail turnout or through the rail turnout; and to provide such a system in which the ramps are provided with shoulders or lateral lips to act as guide elements to steer the vehicle wheels into the rail turnout.

With the above and other objects in view, which appear in the following description and in the appended claims, preferred but illustrative embodiments of the present invention are shown in the accompanying drawings, throughout which corresponding reference characters are used to designate corresponding parts and in which:

Figure 1 is a plan view of an improved track system adapted to positively guide a combined road and rail vehicle past a rail turnout;

Figure 2 is a fragmentary view in side elevation, taken along the line 2—2 of Figure 1;

Figure 3 is a fragmentary view in vertical section, taken along the line 3—3 of Figure 1;

Figure 4 is a view in front elevation, taken along the line 4—4 of Figure 1;

Figure 5 is a plan view of an improved trackway system, selectively adjustable to either guide a combined road and rail vehicle past, or into, a rail turnout;

Figure 6 is a fragmentary view in vertical section of a preferred construction of projectable and compressible ramp, taken along the line 6—6 of Figure 5; and Figure 7 is a view in vertical section, taken along the line 7—7 of Figure 5.

Referring first to Figures 1 through 4, a conventional rail turnout is illustrated as comprising the rails 10 and 12 of a main track, which are connected to the turnout rails 14 and 16 through the conventional switch points 18 and 20, the interconnecting rail sections 22 and 24, and a conventional frog 26. As will be appreciated, the switch points 18 and 20 are illustrated in the positions occupied thereby to accommodate the passage of rail vehicles past or through the rail turnout, but are adapted to be pivoted to the dotted line positions in order to accommodate the passage of vehicles into the turnout rails 14 and 16.

The flanged elements 30 of the wheels of a combined road and rail vehicle are carried upon an axle 32, and are of proper gauge to ride upon the rails in the conventional way. In the illustrated construction, each vehicle wheel is of a dual construction, and is provided with a pneumatic tire portion 34, concentric with the associated flange portion 30, and rigidly secured thereto in any suitable way. As is evident from the drawings, the pneumatic portions 34 are of slightly larger diameter than the flanged portions 30 so that, during travel upon a usual road or highway, the vehicle is supported upon the pneumatic portions and the flanged portions rotate clear of the road. During rail travel, the pneumatic portions 34 overhang the rails, but are slightly spaced from the supporting track structure so that the vehicle is carried entirely by the flanged portions 30.

It will be appreciated that, although only a single pair of dual wheels is illustrated in the drawings, the complete road and rail vehicle may be provided with one or more additional pairs of wheels, all of which pairs may be suitably connected to the vehicle frame structure, designated generally as 36 in Figure 4. It will also be appreciated that the leading pair of dual wheels may be of dirigible construction, to permit the usual steering of the vehicle during highway travel. Also, as shown in the above identified co-pending application Serial No. 536,207, suitable steering lock mechanism may be provided to lock the dirigible wheels in straight ahead position, to prevent steering or turning thereof during rail travel.

In accordance with the present invention, the turnout rail 14 is provided with a ramp 40 which gradually rises from an initial elevation below the level of the associated pneumatic wheel portions 34, to an elevation substantially flush with the top of rail 14. A similar progressively rising ramp 42 is associated with the main rail 10, and a ramp 44 of uniform elevation, substantially flush with the top surfaces of the rails 14 and 16 is provided which extends between such two rails.

It will be appreciated that the angle of rise of the two ramps 40 and 42 may vary with the expected speed at which the road and rail vehicles will traverse the turnout. Preferably, the rise is quite gradual, so that the vehicle is not subjected to an abrupt change in elevation.

The ramps 40, 42 and 44 may be constructed in various ways, either of timber or of other materials, such as steel. As best shown in Figure 3, a preferred ramp construction, and form of connection between the ramp and the associated rail, comprises an angle bracket 46 bolted to the web of the associated rail and to which the ramp 44 is secured by a bolt 48. The outer edge of the ramp 44 is supported by a block 50, in turn directly secured to the supporting track structure by a screw bolt 52.

The through rail 12 is provided with a pair of guard rails 54 and 56, positioned at either end of the switch point 20 and which, in conjunction therewith, and also in conjunction with the rail 12, define a continuous slot, between the two walls of which the flange of a flanged element 30 is positively guided during the passage of the vehicle over the turnout. The ends of the guard rail 56 are flared as at 58 and the right hand end of the guard rail 54, as viewed in Figure 1, is preferably correspondingly flared. The left hand end of the guard rail 54, as viewed in Figure 1, is tapered to mate with the connecting rail 22. The guard rail structure provided by the guard rails 54 and 56 and the switch point 20 preferably extends substantially coextensively with the ramps 40, 42 and 44, so that, as soon as a pneumatic wheel member starts to ride up on either ramp 40 or 42 depending upon the direction of movement of the vehicle, the flanged element on the opposite side of the vehicle enters the guide slot.

In operation, accordingly, as a vehicle approaches a turnout the right hand pneumatic member 34, as viewed in Figure 4, rides up on the associated ramp 40 or 42, to an elevation in which it is supported substantially flush with the upper surface of the turnout rails 14 and 16, in which position it may freely pass thereover without bouncing. During the time that such pneumatic member is traveling upon a ramp, an immediately opposite flanged element 30 is guided within the guide slot formed by the rail 12, the guide rails 56, 54 and the switch point 20. As will be appreciated from Figure 4, the rail 12 prevents lateral movement of the vehicle to the left as viewed in this figure, and the guard rail elements correspondingly prevent lateral movement of the vehicle to the right. In making crossings it is seen therefore that the structure cooperating with the wheels on one side of the vehicle act to positively guide the vehicle and prevent lateral movement in excess of a predetermined limited amount in either direction. In making the crossings, the vehicle tilts somewhat due to the ramp structure, but, due to the gradual inclination of the ramps, the tilting is not abrupt, and, in practice, does not interfere with safe operation of the vehicle.

As stated generally above, it is preferred, in the practice of the present invention, to dispense with the pilot wheels employed in the structure of the above identified application, and to use instead, a guide pin arrangement of the type shown and claimed in the second of the above two co-pending applications. In the figures, the guide pin is designated 60, and is relatively freely movable vertically within a sleeve 62 provided therefor, which sleeve is clamped to the axle 32 by means of bracket 64 and one or more C clamps 66. Preferably, means are provided to bias the guide pin 60 to a lower position, in which it is effective to enter a suitable slot formed between the main rails to thereby guide the vehicle. As set forth in the last mentioned co-pending application, the guide pin is particularly useful in guiding the vehicle past highway and rail intersections, at which points the wheels at both sides of the vehicles must be raised to positions flush with the track levels, and may also be used to guide the vehicle past rail turnouts. In accordance with the present invention, the guide pin is found unnecessary and a further feature of the present invention resides in the provision of an auxiliary ramp 68, positioned between the rails in a position to cooperate with the guide pin to move it upwardly far enough to freely pass over the connecting rail portion 22. Accordingly, even though the vehicle operator may fail to manually retract the guide pin upon approaching a rail turnout, the ramp 68 functions positively to move it upwardly to a safe position. The ramp 68 preferably extends sufficiently far on each side of the connecting rail 22 to avoid a too abrupt upward movement of the guide pin 60.

In the embodiment of Figures 5, 6 and 7, supplementary structure is provided to positively guide the vehicle either through a rail turnout, or into a rail turnout. Except in the respects noted below, the arrangement is preferably as described with reference to Figures 1 through 4, as indicated by the corresponding characters, so that it is considered necessary to describe only the differences in structure of the two arrangements.

In Figures 5, 6 and 7, the ramp 40 is replaced by a ramp 70, of substantially the same length as the ramp 40, but provided with an upstanding lip or flange 72, which provides a guiding side wall for the pneumatic elements of the corresponding vehicle wheels. The ramp 70 also includes a turned end portion 74, having a lip 75, and which follows the curvature of the turnout rail 16, but is rather sharply angled, to promptly lower the associated pneumatic elements to the rail-engaging position. A guard rail 76, similar to guard rails 54 and 56, is disposed along the turnout rail 16 and extends sufficiently far to positively guide the vehicle until after the opposite wheels have passed completely into the turnout.

The side of the track opposite to ramp 70 is provided with a selectively projectable and retractible ramp 80, the surface of which may be either gradually or rather sharply angled, and the outer edge of which is provided with a lip or wall 82, similar to the lip 72. The ramp 80 may be mounted for selective projection and retraction in any one of a variety of ways, the illustrated arrangement comprising a pair of crankshafts 84, the offsets of which are journaled in elongated slots in brackets 86 secured to the base of ramp 80. Rotation of the crankshafts 84 to the illustrated position, raises the ramp 80 to the projected position, in which the horizontal portion of the ramp is substantially flush with the level of the associated rail 12, and the low point of the ramp is slightly below the normal level of the pneumatic element of a corresponding dual wheel. In retracted position, the high point of the ramp 80 lies substantially flush with the surface of the supporting track structure, below the level of the pneumatic wheel portions. It will be appreciated that suitable guide structure may be provided to guide ramp 80 during its up and down movements.

To maintain the pneumatic elements of the dual wheels associated with ramp 80 at the track level during passage of the vehicle into the turnout, auxiliary ramps 90 and 92 are provided between the main tracks, and a lowering ramp 94 is provided at the side of the track remote from ramp 80. The ramps 90 and 92 are provided with lips 91 and 93. An additional ramp 96 is provided to lift the vehicle guide pin over the rail 24.

In operation, the switch points 18 and 20 normally occupy the positions shown in Fig. 1, in which they are adapted to provide through travel, and the depressible ramp 80 occupies the depressed position in which it does not interfere with the passage thereover of the pneumatic elements 34 of a vehicle. In such positions, the passage of a vehicle past the road turnout is as described with reference to Figures 1 through 4, the ramps 70, 44 and 42 acting to lift the pneumatic element at one side of the vehicle to the level of the turnout rails, and the flanges associated with the opposite side of the vehicle being guided in the guide slots provided by the rails 12 and the guard rails 54 and 56 and the switch point 20.

When it is desired to run a vehicle into the turnout, the switch points 18 and 20 may be thrown to the position shown in Fig. 5, and the ramp 80 may be elevated to the position shown in Fig. 6. The operating mechanism for throwing the switch points and for rotating the crank shafts 84 has not been shown, but it will be appreciated that if desired these elements may be arranged for simultaneous operation, either automatically or manually. Upon the approach of a vehicle to the turnout, the pneumatic elements of the leading wheel thereof on one side is raised by the ramp 70, and the pneumatic element at the other side is raised by the now projected ramp 80. As the vehicle continues, the pneumatic element riding upon ramp 80 is guided into the turnout by the lip 82 associated therewith. Upon passing on to the ramps 90 and 92, such wheel is similarly guided further into the turnout by the lips associated therewith. As soon as the vehicle wheel associated with ramp 70 passes down off of the angled ramp portion 74, the associated flanged element 30 enters the slot between the turnout rail 16 and the guard rail 76, and thus becomes effective to replace the guiding functions previously provided by the ramp lips. As the trailing wheels of the vehicle pass into the turnout, they are retained against lateral movement of the track by the lip 72 associated with the ramp 70, which lip continues until such trailing wheels move down the ramp 74, rendering the flanges associated therewith effective to enter the guide slot. In negotiating a complete turnout, accordingly, the vehicle is guided in part by the guard rail 76 and in part by the ramps and the lips associated therewith.

It will be appreciated that, if desired, the ramp 70 may be made depressible in the manner described with reference to ramp 80. Thus in passing the turnout, ramp 70 may be elevated and ramp 80 depressed. In going into the turnout, ramp 70 may be depressed and ramp 80 elevated. In such instance the guard rail 76, which extends up to switch point 18, in conjunction with point 18 and rail 14, forms a continuous guide slot to guide the flanged wheels of the vehicle into the turnout, and supplementing or entirely replacing the guiding action of the ramp lips 82, 91 and 93.

Although specific embodiments of the present invention have been described, it will be appreciated that various changes in the form, number and arrangement of parts may be made within the spirit and scope thereof.

What is claimed is:

1. In a track system for a combined road and rail vehicle having dual wheels including a flanged rail-engaging portion and a somewhat larger road-engaging portion, the combination with main rails, turnout rails, and a switch point associated therewith, of a ramp positioned along one of said main rails and traversing said turnout rails to lift the road portion of an associated wheel to the level of said turnout rails, a guard rail positioned adjacent the other of said main rails at each end of said switch point, said guard rail and said switch point forming with said other main rail a guide slot to receive the flanged element of a corresponding vehicle wheel and guide the same during the passage of said vehicle over said ramp.

2. In a track guiding system for a combined road and rail vehicle having dual wheels, each of said wheels including a flanged rail-engaging portion and a somewhat larger road-engaging portion, the combination with main rails and turnout rails of a rail turnout of a ramp disposed at one side of one of said rails and effective to raise the road portion of an associated wheel to the level of the rails, and a guard rail positioned on the opposite side of said one rail and forming with said one rail a guide slot, said guard rail extending beyond one end of said ramp.

3. In a track system for a combined road and rail vehicle having dual wheels, each wheel including a flanged rail-engaging portion and a somewhat larger road-engaging portion, the combination with the main rails and turnout rails of a rail turnout, of means positioned along said rails for cooperating with the road portions of wheels at one side of the vehicle and with the flanged portions of wheels at the other side of the vehicle for guiding said vehicle into said rail turnout.

4. In a track system for a combined road and rail vehicle having dual wheels, each wheel including a flanged rail-engaging portion and a somewhat larger road-engaging portion, the combination with a main rail and an associated turnout rail, of a projectable and depressible ramp individual to each of said rails and positioned adjacent the corresponding rail, and a guard rail individual to each of said rails and positioned in spaced slot-forming relation to the associated rail.

5. In a track system for a combined road and rail vehicle having dual wheels, each wheel embodying a flanged rail-engaging portion and a somewhat larger road-engaging portion, the combination with a rail turnout formed of a first pair of rails and a second pair of rails, of guiding means for the vehicle including a ramp movable between projected and retracted positions disposed along one of said rails; said ramp being effective in said projected position to lift the corresponding road portion of a wheel and to cooperate in guiding said vehicle along said first pair of rails and disposed in said retracted position to permit said vehicle to traverse said second pair of rails.

6. In a track guiding system for a combined road and rail vehicle having dual wheels, each of said wheels including a flanged rail-engaging portion and a somewhat larger road-engaging portion, the combination with the main rails and turnout rails of a track turnout, of a projectable and depressible ramp positioned along one of said main rails adjacent one of said turnout rails, said ramp being disposed in its projected position to lift one side of the vehicle to bring the road portion of a wheel at that side to the level of the main and turnout rails so as to permit said wheel to pass over said one main rail onto said one turnout rail, and disposed in its depressed position to be below the normal level of said road portion.

7. In a track guiding system for a combined road and rail vehicle having dual wheels, each of said wheels including a flanged rail-engaging portion and a somewhat larger road-engaging portion, the combination with the main rails and turnout rails of a track turnout, of a projectable and retractable ramp positioned along one of said main rails adjacent one of said turnout rails, said ramp being disposed in its projected position to lift one side of the vehicle to bring the road portion of a wheel at that side to the level of the main and turnout rails so as to permit said wheel to pass over said one main rail onto said one turnout rail, and disposed in its retracted position to be below the normal level of said road portion.

8. In a track guiding system for a combined road and rail vehicle having dual wheels, each of said wheels including a flanged rail-engaging portion and a somewhat larger road-engaging portion, the combination with the main rails and turnout rails of a track turnout, of a projectable and retractable ramp positioned along one of said main rails adjacent one of said turnout rails, said ramp being disposed in its projected position to lift one side of the vehicle to bring the road portion of a wheel at that side to the level of the main and turnout rails so as to permit said wheel to pass over said one main rail onto said one turnout rail, and disposed in its retracted position to be below the normal level of said road portion, said ramp having a lip formed thereon to cooperate with the associated wheel to guide said vehicle while said wheel is raised by said ramp.

DAVID W. MAIN.